United States Patent
Yi et al.

(10) Patent No.: US 10,012,125 B2
(45) Date of Patent: *Jul. 3, 2018

(54) DUAL MIXER FOR EXHAUST AFTERTREATMENT SYSTEMS

(71) Applicant: Caterpillar Inc., Peoria, IL (US)

(72) Inventors: Yong Yi, Dunlap, IL (US); Stefan Fejer-Simon, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 194 days.

This patent is subject to a terminal disclaimer.

(21) Appl. No.: 15/204,549

(22) Filed: Jul. 7, 2016

(65) Prior Publication Data
US 2017/0314444 A1 Nov. 2, 2017

Related U.S. Application Data

(63) Continuation-in-part of application No. 15/144,386, filed on May 2, 2016, now Pat. No. 9,909,478.

(51) Int. Cl.
*F01N 3/20* (2006.01)
*F01N 3/28* (2006.01)

(52) U.S. Cl.
CPC ......... *F01N 3/2892* (2013.01); *F01N 3/2066* (2013.01); *F01N 2610/01* (2013.01); *F01N 2610/1453* (2013.01)

(58) Field of Classification Search
CPC .. B01F 3/04049; B01F 5/0451; B01F 5/0618; B01F 5/0619; F01N 3/2892; F01N 2240/20; F01N 2610/01; F01N 2610/02; F01N 2610/1453; F01N 3/2066
See application file for complete search history.

(56) References Cited

U.S. PATENT DOCUMENTS

| | | |
|---|---|---|
| 5,605,399 A | 2/1997 | King |
| 6,595,679 B2 | 7/2003 | Schuchardt |
| 8,141,353 B2 | 3/2012 | Zheng et al. |
| 8,371,114 B2 | 2/2013 | Hayashi et al. |
| 8,607,555 B2 | 12/2013 | Kaiser et al. |
| 8,999,276 B1 | 4/2015 | Bui |
| 2011/0174407 A1 | 7/2011 | Lundberg |
| 2012/0011837 A1 | 1/2012 | Navathe et al. |
| 2012/0204541 A1 | 8/2012 | Li et al. |
| 2012/0320708 A1 | 12/2012 | Geibel |

(Continued)

FOREIGN PATENT DOCUMENTS

| | | |
|---|---|---|
| DE | 102006058715 B3 | 1/2008 |
| DE | 102007012790 | 9/2008 |

(Continued)

*Primary Examiner* — Brandon Lee
(74) *Attorney, Agent, or Firm* — Miller, Matthias & Hull

(57) ABSTRACT

A dual mixer for mixing a reducing agent with exhaust gas in a mixing section of a selective catalytic reduction (SCR) aftertreatment system is disclosed. The dual mixer may comprise a first mixer including a grid and a plurality of trapezoidal fins projecting from the grid in a direction of flow of the exhaust gas. The dual mixer may further comprise a swirl mixer positioned downstream of the first mixer and separated therefrom by a distance. The swirl mixer may include a base and three arrays of swirl fins projecting from the base in the direction of flow of the exhaust gas. The swirl fins in each of the arrays may be oriented in a common direction that is rotated by about 60° from the common direction of the swirl fins in an adjacent array.

18 Claims, 7 Drawing Sheets

(56) References Cited

U.S. PATENT DOCUMENTS

| | | |
|---|---|---|
| 2013/0170973 A1 | 7/2013 | Staskowiak et al. |
| 2014/0033686 A1 | 2/2014 | Fischer et al. |
| 2014/0053538 A1 | 2/2014 | Reeves et al. |
| 2016/0175784 A1 | 6/2016 | Harmon et al. |

FOREIGN PATENT DOCUMENTS

| | | |
|---|---|---|
| EP | 1712751 | 10/2006 |
| EP | 2596854 B1 | 7/2015 |
| KR | 101340889 B1 | 12/2013 |

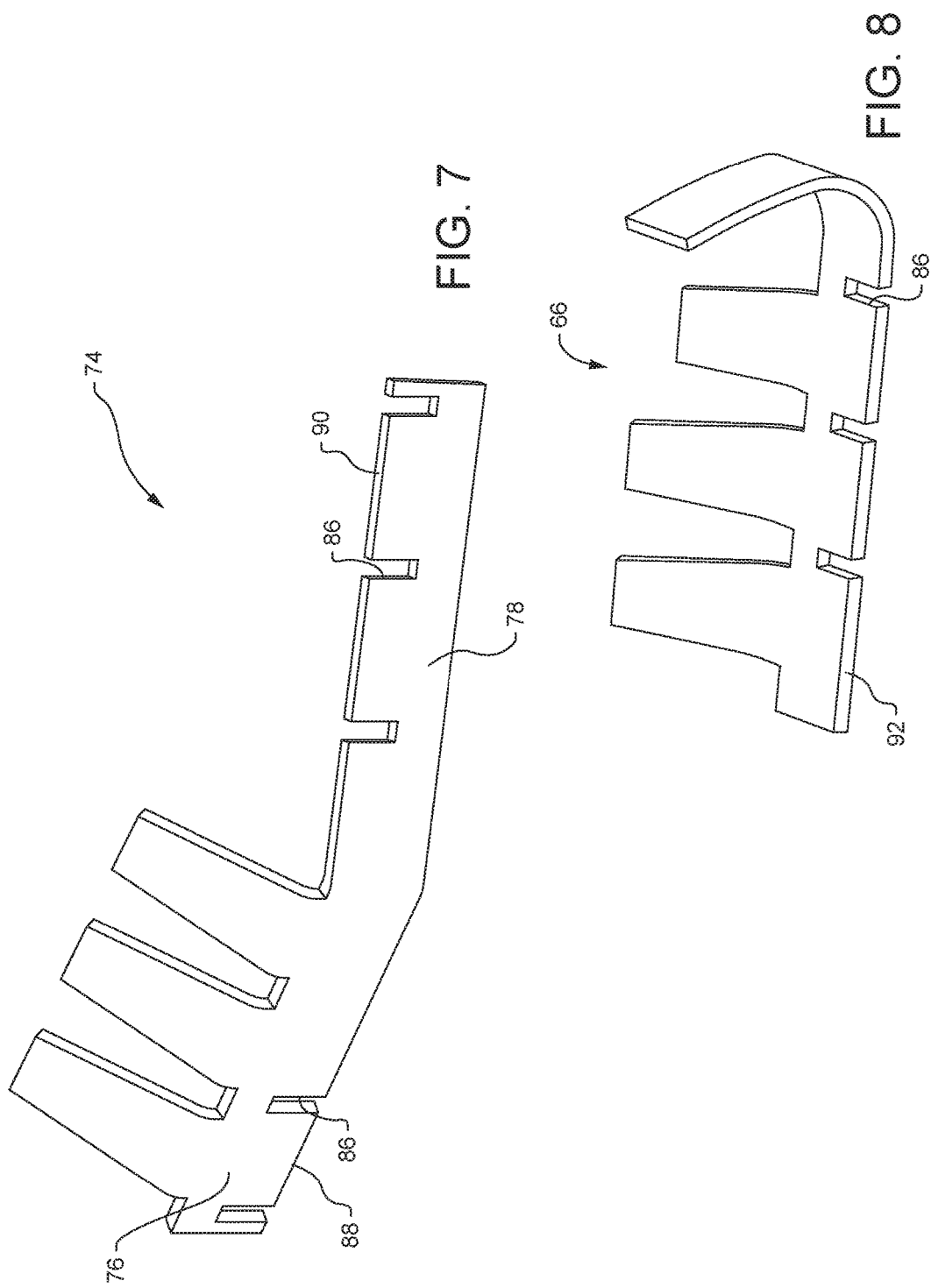

DUAL MIXER FOR EXHAUST AFTERTREATMENT SYSTEMS

CROSS-REFERENCE TO RELATED APPLICATION

This application is a continuation-in-part pursuant to 35 U.S.C. § 120 of U.S. patent application Ser. No. 15/144,386 filed on May 2, 2016.

TECHNICAL FIELD

The present disclosure generally relates to mixers for exhaust aftertreatment systems and, more specifically, to a dual mixer for mixing a reducing agent with exhaust gas in a selective catalytic reduction (SCR) aftertreatment system.

BACKGROUND

Nitrogen oxide ($NO_x$) gases, such as nitric oxide (NO) and nitrogen dioxide ($NO_2$), are pollutants that may be produced when fuel is combusted at high temperatures in internal combustion engines. These gases may have adverse health effects, and may participate in the formation of smog and acid rain. In order to comply with increasingly demanding low $NO_x$ emission regulations, engine manufacturers may be compelled to use technologies that substantially decrease $NO_x$ emissions from engine exhaust. One such technology is selective catalytic reduction (SCR) aftertreatment systems which catalyze the reduction of $NO_x$ in exhaust gas to nitrogen and water prior to release of the exhaust gas from an exhaust outlet, such as a tailpipe. In a SCR aftertreatment system, a reducing agent is injected as a liquid into the exhaust gas stream of the exhaust pipe, and the mixture of the reducing agent and the exhaust gas is passed through a downstream SCR catalyst which uses the reducing agent to catalyze the reduction of $NO_x$ in the exhaust gas stream. The reducing agent may be ammonia, or it may be urea that is subsequently hydrolyzed to ammonia in the exhaust gas stream. In the context of diesel engines, a reducing agent consisting of urea and water is referred to as diesel exhaust fluid (DEF).

The reducing agent should be evaporated and well mixed with the exhaust gas prior to introduction to the SCR catalyst to ensure that the reduction of $NO_x$ at the SCR catalyst proceeds efficiently. Evaporation of the reducing agent not only assists even distribution of the reducing agent in the exhaust gas, but also avoids undesirable accumulation of reducing agent deposits in the exhaust pipe that could lead to decreased conversion efficiencies as well as increased back pressure in the exhaust pipe. To promote evaporation of the reducing agent and mixing of the reducing agent with the exhaust gas, a mixer may be provided in the exhaust pipe between the injector and the SCR catalyst. However, it may be a challenge to provide a mixer that meets performance standards in terms of both mixing the reducing agent with the exhaust gas, and curtailing deposit accumulation by promoting reducing agent evaporation.

One example of a reducing agent mixer is described in U.S. Pat. No. 8,607,555. The patent discloses a mixing element that includes a grid supporting rows of trapezoidal deflector elements that are oriented in different directions. The patent also discloses a mixing element that includes four fields of deflector elements that are turned 90° with respect to each other to generate rotational motion to the exhaust gases and reducing agent flowing through the mixer.

Although the above mixing elements are effective, there is still a need for improved mixing systems that promote both evaporation of the reducing agent and mixing of the reducing agent with the exhaust gas prior to introduction to the SCR catalyst.

SUMMARY

In accordance with one aspect of the present disclosure, a dual mixer for mixing a reducing agent with exhaust gas in a mixing section of a selective catalytic reduction (SCR) aftertreatment system is disclosed. The dual mixer may comprise a first mixer positioned in the mixing section that includes a grid permitting a flow of the reducing agent and the exhaust gas therethrough. The first mixer may further include a plurality of trapezoidal fins projecting from the grid in a direction of flow of the exhaust gas. In addition, the dual mixer may further comprise a swirl mixer position downstream from the first mixer in the mixing section and separated from the first mixer by a distance. The swirl mixer may include a base permitting the flow of the reducing agent and the exhaust gas therethrough, and three arrays of swirl fins projecting from the base in the direction of flow of the exhaust gas. The swirl fins may be arranged in a triangular configuration about a center of the mixer to induce a swirl motion in the reducing agent and the exhaust gas flowing through the swirl mixer. The swirl fins in each of the arrays may be oriented in a common direction that is rotated by about 60° from the common direction of the swirl fins in an adjacent array.

In accordance with another aspect of the present disclosure, a dual mixer for mixing a reducing agent with exhaust gas in an exhaust pipe upstream of a selective catalytic reduction (SCR) catalyst is disclosed. The dual mixer may comprise a first mixer that includes a planar grid, and a plurality of parallel rows of trapezoidal fins projecting from the planar grid in a direction of flow of the exhaust gas. The trapezoidal fins in each of the parallel rows may alternate in orientation direction and may be angled by about 20° with respect to the planar grid. The dual mixer may further comprise a swirl mixer downstream of the first mixer and spaced from the first mixer by a distance. The swirl mixer may include a planar base having a plurality of radial legs extending radially from a center of the base that are equally spaced from each other in a circumferential direction. The swirl mixer may further include a plurality of trapezoidal swirl fins projecting from each of the radial legs in the direction of flow of the exhaust gas. The trapezoidal swirl fins projecting from each of the radial legs may be oriented in a common direction that is rotated by an angle with respect to the common direction of the trapezoidal swirl fins projecting from an adjacent radial leg.

In accordance with another aspect of the present disclosure, a selective catalytic reduction (SCR) aftertreatment system for exhaust gas of a diesel engine is disclosed. The SCR aftertreatment system may comprise an exhaust pipe configured to carry the exhaust gas from the diesel engine to an exhaust outlet, an injector configured to inject diesel exhaust fluid (DEF) into the exhaust pipe, and an SCR catalyst downstream of the injector configured to catalyze the reduction of $NO_x$ in the exhaust gas. The SCR aftertreatment system may further comprise a dual mixer positioned in the exhaust pipe downstream of the injector and upstream of the SCR catalyst. The dual mixer may include a first mixer configured to promote evaporation of the DEF passing therethrough. The first mixer may include a planar grid and a plurality of parallel rows of fins projecting from the planar grid in a downstream direction. The fins of the first mixer may be angled by about 20° with respect to the planar grid. The dual mixer may further include a swirl mixer downstream of the first mixer configured to promote mixing of the DEF and the exhaust gas passing therethrough. The swirl mixer may include arrays of swirl fins projecting from the swirl mixer in the downstream direction. Each of the arrays of the swirl mixer may include a plurality of parallel rows of swirl fins that are oriented in a common direction that is rotated by about 60° from the common direction of an adjacent array.

These and other aspects and features of the present disclosure will be more readily understood when read in conjunction with the accompanying drawings.

BRIEF DESCRIPTION OF THE DRAWINGS

FIG. 7 is a perspective view of a support element of the swirl mixer shown in isolation, constructed in accordance with the present disclosure.

FIG. 8 is a perspective view of a radial leg of the swirl mixer shown in isolation, constructed in accordance with the present disclosure.

DETAILED DESCRIPTION

Figure 1:
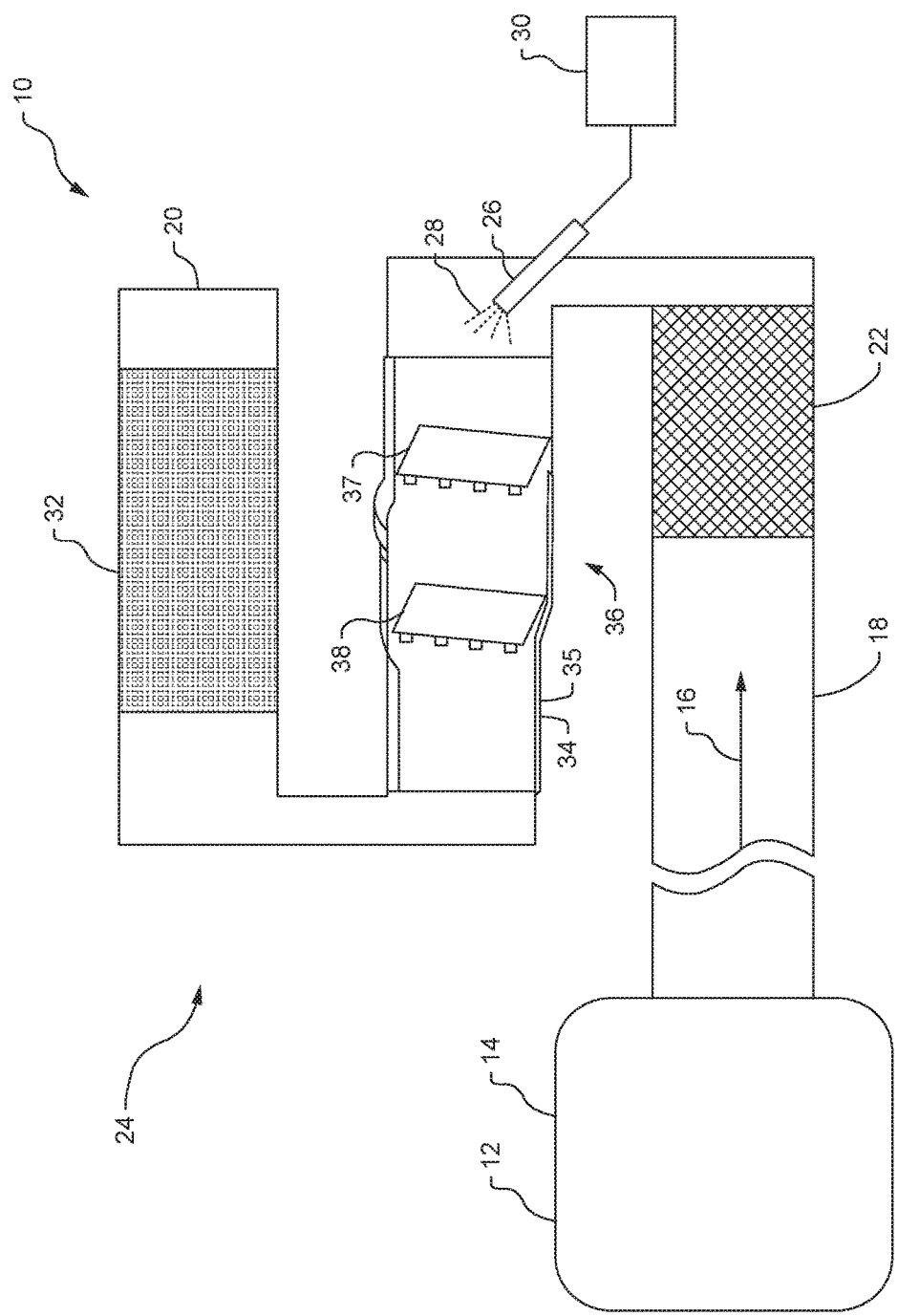
FIG. 1 is a schematic view of an exhaust aftertreatment system for an engine having a dual mixer for mixing a reducing agent with an exhaust gas, constructed in accordance with the present disclosure.

Referring now to the drawings, and with specific reference to FIG. 1, an exhaust aftertreatment system 10 for an internal combustion engine 12, such as a diesel engine 14, is shown. The exhaust aftertreatment system 10 may include components that remove at least some of the pollutants in an exhaust gas 16 emitted by the engine 12 through an exhaust pipe 18 prior to release of the exhaust gas from an exhaust outlet 20, such as a tailpipe. In particular, the aftertreatment system 10 may include a particulate filter 22 disposed in the exhaust pipe 18 that filters out particulates from the exhaust gas 16. Downstream of the particulate filter 22 in the exhaust pipe 18 may be a selective catalytic reduction (SCR) aftertreatment system 24 for catalyzing the reduction of $NO_x$ in the exhaust gas 16 to nitrogen and water. Alternative arrangements of the aftertreatment system 10 may lack a particulate filter.

The SCR aftertreatment system 24 may include an injector 26 for injecting a reducing agent 28 from a supply source 30 into the exhaust gas 16 flowing in the exhaust pipe 18. The reducing agent 28 may be a mixture of urea and water (also referred to as diesel exhaust fluid (DEF) if the engine 12 is a diesel engine), and the urea may be hydrolyzed to ammonia in the exhaust pipe 18. Alternatively, the reducing agent 28 may be ammonia. The reducing agent 28 may initially be injected into the exhaust pipe 18 as a liquid, and later evaporated in the exhaust pipe 18 (see further details below). Downstream of the injector 26 may be a catalyst 32 that uses the reducing agent 28 to catalyze the reduction of $NO_x$ in the exhaust gas 16 to nitrogen and water prior to release of the exhaust gas through the outlet 20.

The SCR aftertreatment system 24 may also include a mixing section 34, such as a mixing tube 35 that is part of the exhaust pipe 18 extending between the injector 26 and the SCR catalyst 32. In the mixing section 34, the reducing agent 28 may be evaporated and/or broken down into smaller droplets and mixed with the exhaust gas prior to its introduction to the catalyst 32. For this purpose, the mixing section 34 may contain a dual mixer 36 that consists of a first mixer 37 and a swirl mixer 38 downstream of the first mixer 37. Specifically, the first mixer 37 may evaporate liquid droplets of the reducing agent 28 and/or break down the reducing agent liquid into smaller droplets, while the swirl mixer 38 may further enhance evaporation of the reducing agent and induce a swirl motion to the reducing agent and the exhaust gas to promote thorough mixing.

The first mixer 37 and the swirl mixer 38 may be separated by a distance that may be optimized based on performance. In one non-limiting example, the first mixer 37 and the swirl mixer 38 may be separated from each other by about 2 inches to about 7 inches, although the separation distance may deviate from this range depending on various design considerations such as the reducing agent flow rate and the diameter of the exhaust pipe. Furthermore, due to the corrosive nature of the reducing agent 28 and vibrations in the exhaust pipe 18, both of the first mixer 37 and the swirl mixer 38 may be formed from a material that is corrosion resistant and robust enough to withstand vibrations. For example, the first mixer 37 and the swirl mixer 38 may both be formed from stainless steel.

Figures 2, 3:
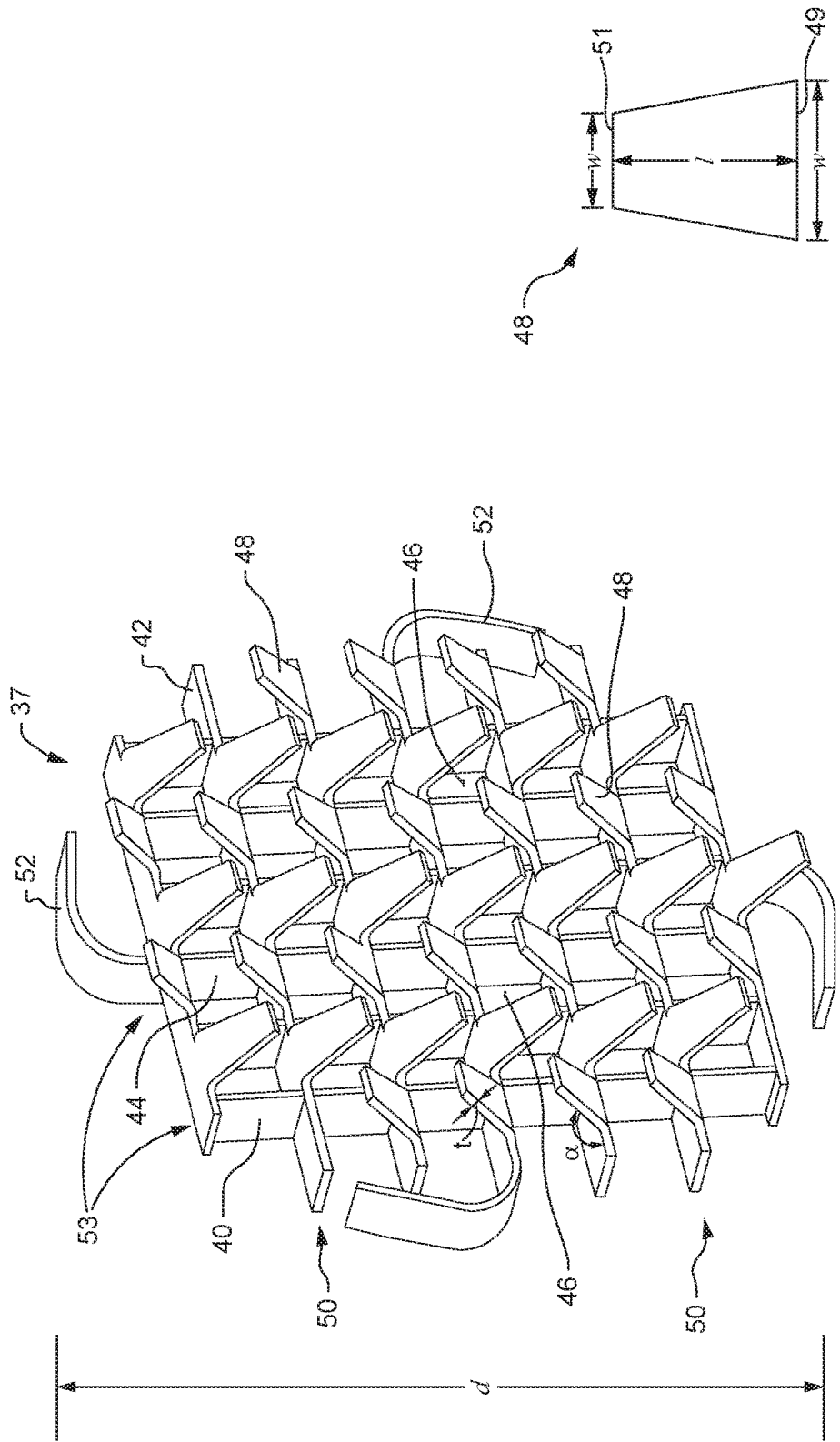
FIG. 2 is a perspective view of a first mixer of the dual mixer of FIG. 1, constructed in accordance with the present disclosure.
FIG. 3 is a plan view of one of the trapezoidal fins of the first mixer shown in isolation, constructed in accordance with the present disclosure.

Turning now to FIG. 2, the first mixer 37 is shown in isolation. The first mixer 37 may include a planar grid 40 formed from a plurality of first support elements 42 arranged perpendicular to and intersecting with a plurality of second support elements 44 to define holes 46 that allow the passage of the reducing agent 28 and the exhaust gas 16 through the mixer 37. Protruding from the grid 40 in the direction of flow of the exhaust gas 16 (i.e., in the downstream direction in the exhaust pipe 18) may be a plurality of fins 48 that promote evaporation of the reducing agent 28. All of the fins 48 of the first mixer 37 may share a common shape and may have the same dimensions. Specifically, all of the fins 48 may have a trapezoidal shape with a wider base 49 and a narrower top 51 (see FIG. 3). In one arrangement, the first mixer 37 may have a diameter (d) of about 5 inches, and each of the fins 48 may have a thickness (t) of about 1 to about 2 millimeters (mm), or of about 1 to about 1.6 mm (see FIG. 2), and a length (l) extending from the base 49 to the top 51 of about 15 (±2) mm (see FIG. 3). Furthermore, in this arrangement, the width (w) of the base 49 may be about 10.5 (±1) mm and the width (w) of the top 51 may be about 6 (±1) mm (see FIG. 3). However, the dimensions of mixer 37 and the fins 48 may be scalable with the diameter of the exhaust pipe 18, with larger mixers 37/fins 48 being used for larger exhaust pipes 18. Moreover, in alternative designs, the fins 48 may have other shapes such as, but not limited to, square, rectangular, triangular, spherical, oval shaped, or other polygonal and amorphous configurations.

Referring still to FIG. 2, the fins 48 of the first mixer 37 may be oriented at a fixed angle (a) with respect to the plane of the grid 40 that may vary between about 10° and about 80° depending on the design of the mixer 37. In one arrangement, the fixed angle (a) of the fins 48 may be about 20° (±0.05°) as applicants have found this angle, compared with other angles, provides a favorable reduction in deposit formation in the exhaust pipe 18. Additionally, the fins 48 may be formed integrally with (or otherwise attached to) and extend from the first support elements 42 to form a plurality of rows 50 of fins. The fins 48 in each of the rows 50 may alternate orientation direction, with one fin 48 pointed in one direction and an immediately adjacent fin 48 pointed in the opposite direction, as shown. Furthermore, the fins 48 of the mixer 37 may be aligned in a plurality of columns 53 that are parallel to the second support elements 44, and all of the fins 48 in each of the columns 53 may be pointed in the same direction such that the orientation direction of the fins 48 alternates between adjacent columns 53. Although FIG. 2 shows seven rows 50 and seven columns 53 of fins, with three to seven fins 48 in each of the rows/columns, it will be understood that the number of rows 50, the number of columns 53, and the number of fins 48 in each row/column may vary depending on diameter of the exhaust pipe 18 with more numbers of rows/columns and more number of fins in each row/column being used with larger pipe diameters. The first mixer 37 may also include curved tabs 52 to allow attachment (e.g., welding) of the mixer 37 to the inner walls of the exhaust pipe 18, such that the first mixer 37 is held stationary in the exhaust pipe 18.

Figure 4:
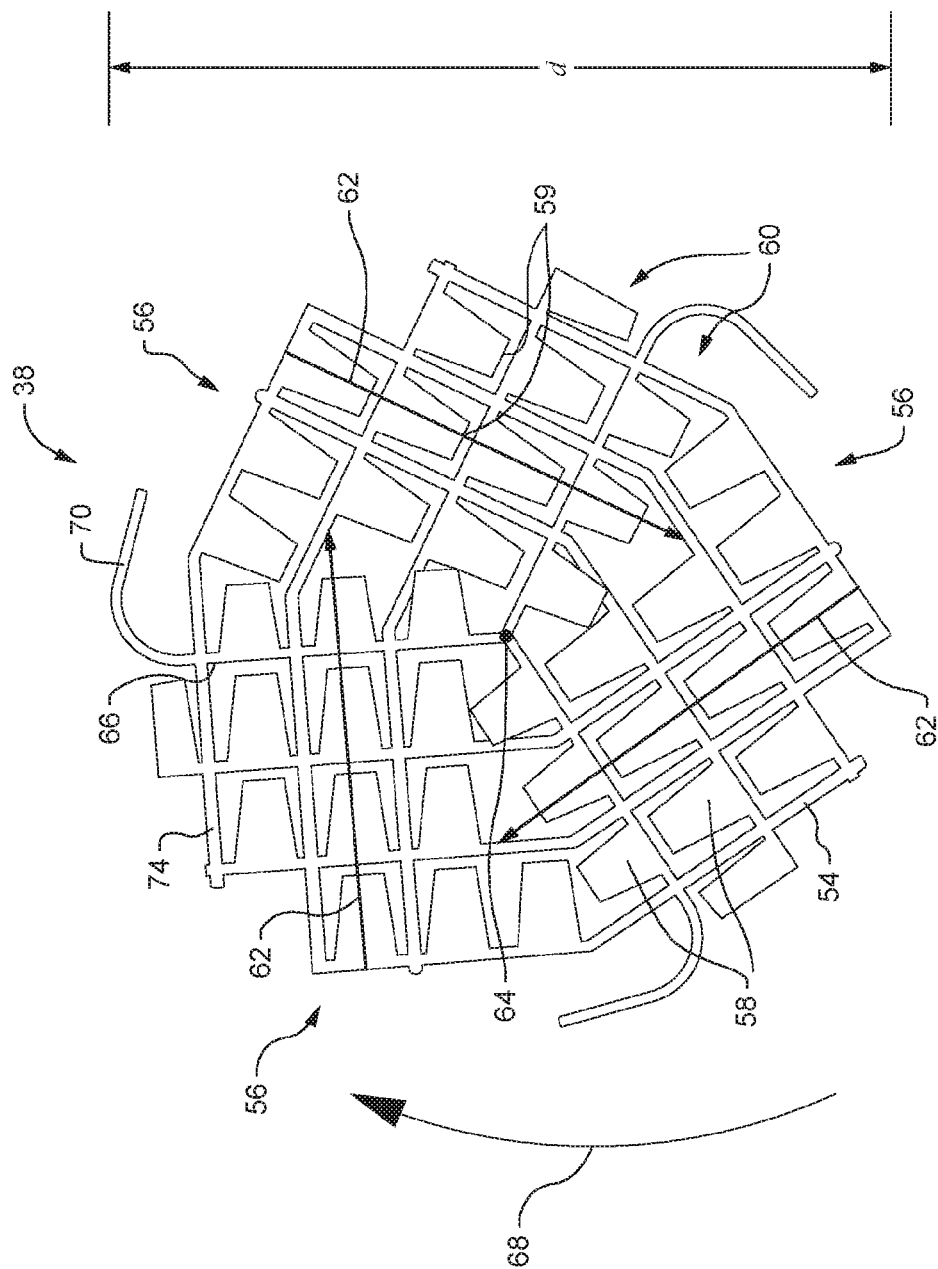
FIG. 4 is a plan view of a swirl mixer of the dual mixer of FIG. 1, constructed in accordance with the present disclosure.
Figure 5:
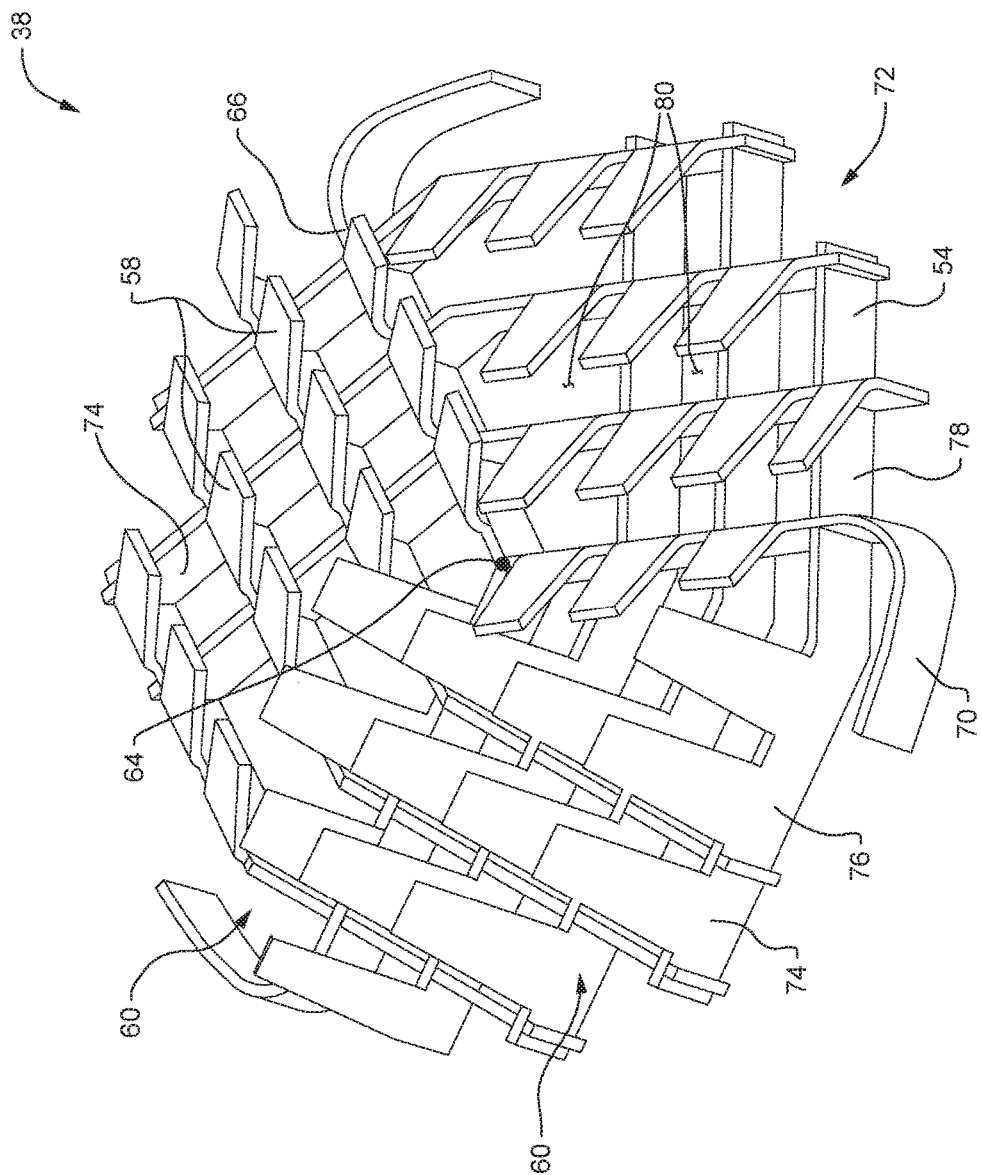
FIG. 5 is a side perspective view of the swirl mixer, constructed in accordance with the present disclosure.

The swirl mixer 38 is shown in isolation in FIGS. 4-5. The swirl mixer 38 may include a base 54 that permits flow of the reducing agent 28 and the exhaust gas 16 therethrough. The swirl mixer 38 may also include a number of arrays 56 of swirl fins 58 projecting from the base 54 in a direction of flow of the exhaust gas 16 in the exhaust pipe 18 (i.e., in a downstream direction in the exhaust pipe 18). As used herein, an "array" is a group of swirl fins 58 arranged in parallel rows 60, wherein all of the swirl fins 58 in the array are oriented in a common direction 62 with the tops 59 of the fins all pointed in the common direction 62 (see FIG. 4). In addition, in each of the arrays 56, the rows 60 may be equally spaced from each other, and the swirl fins 58 in each of the rows 60 may be equally spaced from each other to provide a regular, repeating pattern of swirl fins 58. The arrays 56 may be identical to each other and may be arranged with respect to each other to provide a circling configuration about a center 64 of the swirl mixer 38 that may run either clockwise or counterclockwise to induce swirl motion in the reducing agent and the exhaust gas flowing through the mixer 38. For example, the depicted swirl mixer 38 includes three arrays 56 in which the common direction 62 of each of the arrays 56 is rotated by about 60° from the common direction 62 of an immediately adjacent array 56 to create a triangular configuration about the center 64, although other numbers of arrays having different rotation angles with respect to each other are possible. Accordingly, in the depicted embodiment, the swirl mixer 38 exhibits three-fold rotational symmetry.

It is noted that the swirl mixer 38 is held stationary in the exhaust pipe 18 and does not rotate, and the swirl motion is induced by the circling configuration of the arrays 56. In alternative configurations of the mixer 38, the arrays 56 may not be identical to each other. In addition, although FIGS. 4-5 show four rows 60 of swirl fins 58 in each of the arrays 56, and three to four swirl fins 58 in each of the rows 60, it will be understood that alternative designs of the swirl mixer 38 may have more or less rows and/or numbers of fins in each row. For instance, the number of rows 60 and the number of swirl fins 58 in each of the rows 60 may be scalable with the diameter of the exhaust pipe 18.

Referring still to FIGS. 4-5, in the depicted embodiment having three arrays 56, the base 54 of the swirl mixer 38 may include three radial legs 66 extending radially from the center 64 of the mixer 38, and the three radial legs 66 may be equally spaced from each other by about 120° in a circumferential direction 68 (see FIG. 4). Furthermore, a plurality of swirl fins 58 may be formed integrally with (or otherwise attached to) and may project from each of the radial legs 66 to form one of the rows 60 of fins in one of the arrays 56. Namely, each of the radial legs 66 may support the last row 60 of fins in an array 56 before the orientation direction of the swirl fins 58 is rotated by 60° in an adjacent array 56. Each of the radial legs 66 may also include a curved tab 70 that extends from the swirl mixer 38 to allow attachment of the mixer 38 to the inner walls of the exhaust pipe 18, such as by welding. In other embodiments, more or less radial legs may be employed.

Turning now to FIG. 5, in the depicted embodiment having three radial legs 66, the base 54 may further include three grids 72 between the radial legs 66 that support and interconnect the arrays 56. The grids 72 may be constructed from a plurality of support elements 74 that each span two adjacent grids to provide interconnectivity and structural robustness to the mixer 38. Specifically, each of the support elements 74 may include a first support element 76 in one of the grids 72 that is integrally formed with (or otherwise attached to) a second support element 78 in an adjacent grid 72. In each of the grids 72, a plurality of the first support elements 76 may be arranged perpendicular to and intersect a plurality of the second support elements 78 to define holes 80 that allow the passage of the reducing agent 28 and the exhaust gas 16 through the mixer 38. Moreover, the first support elements 76 may be formed integrally with (or otherwise attached to) the swirl fins 58 to define one of the rows 60 in an array 56. Furthermore, the first support elements 76 in each grid 72 may run parallel to the radial leg 66 that supports swirl fins 58 in the same array 56, while the second support elements 78 may run perpendicular to and interconnect the first support elements 76 and the radial leg 66 in the array 56. Moreover, in other embodiments employing a different number of radial legs 66, a corresponding number of grids 72 may be formed between the radial legs 66.

Figure 6:
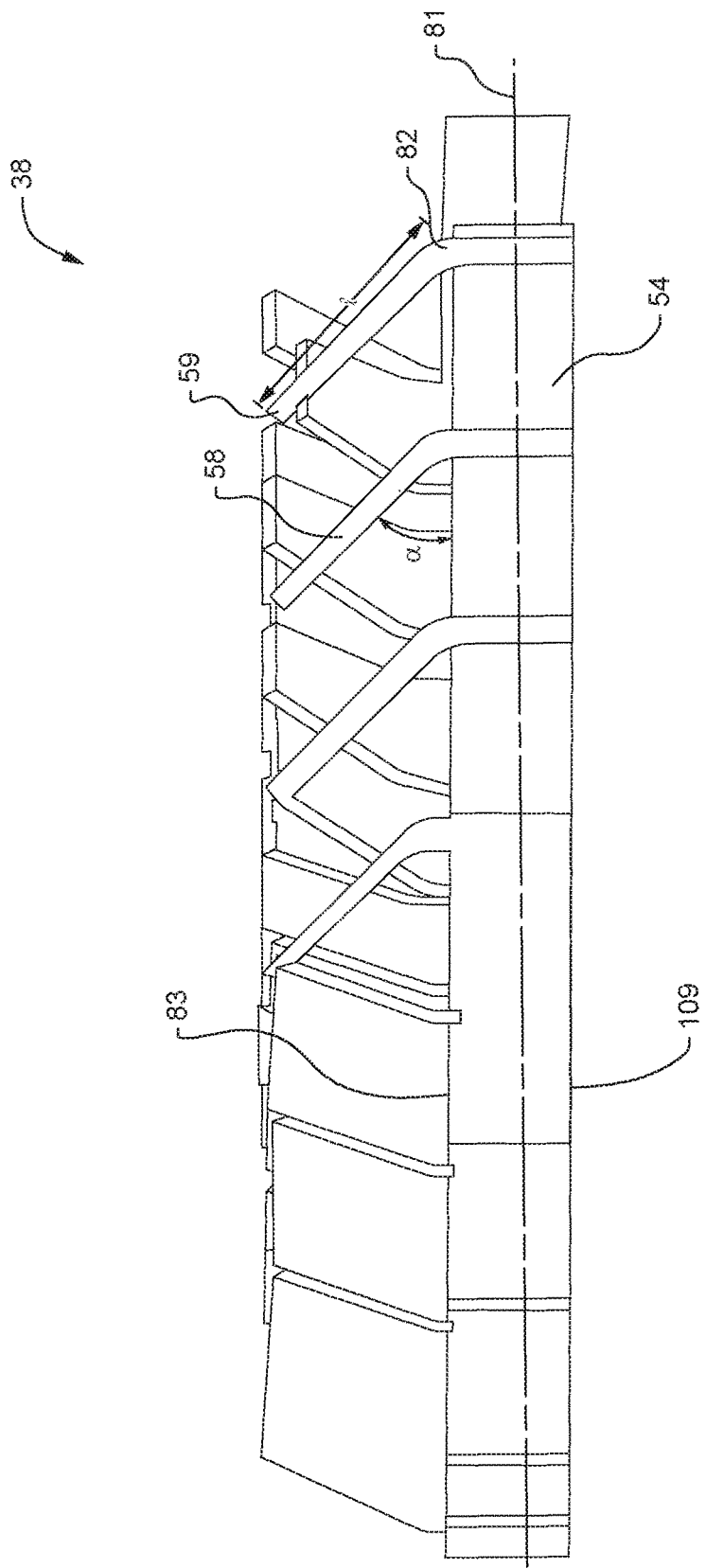
FIG. 6 is a side view of the swirl mixer, constructed in accordance with the present disclosure.

The base 54 of the swirl mixer 38 may be planar and extend along a plane 81, and the swirl fins 58 may project from a downstream face 83 of the base at a fixed angle (a) with respect to the plane 81 of the base 54, as shown in FIG. 6. The angle (a) may be about 45°, although other angles between about 5° and about 80° may also be used in some circumstances. Additionally, as shown in FIGS. 4-5, each of the swirl fins 58 of the swirl mixer 38 may have identical shapes and dimensions. Specifically, the swirl fins 58 may be trapezoidal (see FIGS. 4-5) with a lengths (l) extending from a bottom 82 to the top 59 of each fin 58 being about 30 millimeters (see FIG. 6). However, the swirl fins 58 may certainly have other shapes (e.g., square, rectangular, triangular, spherical, oval, other polygonal shapes, etc.) and dimensions in alternative designs of the mixer 38. The diameter of the swirl mixer 38 may be scalable with the exhaust pipe dimensions, with larger mixers being used with larger exhaust pipes. In one non-limiting arrangement, the swirl mixer 38 may have a diameter (d) of about 5 inches (see FIG. 4).

As shown in FIG. 7, each of the support elements 74 may include slots 86 to permit connection to other support elements 74 when assembling the swirl mixer 38. For example, the first support elements 76 may each have slots 86 presented on an upstream side 88, while the second support elements 78 may each have slots 86 presented on a downstream side 90. Accordingly, the grids 72 of the swirl mixer 38 may be assembled by connecting the slots 86 of the first support elements 76 with the slots 86 of the second support elements 78. Likewise, as shown in FIG. 8, each of the radial legs 66 may have slots 86 presented on an upstream side 92, such that the slots 86 of the radial legs 66 may be connected to the slots 86 of the second support elements 78 when assembling the swirl mixer 38 (see further details below).

INDUSTRIAL APPLICABILITY

In general, the teachings of the present disclosure may find applicability in many industries including, but not limited to, automotive, construction, agriculture, mining, power generation, and rail transport applications, among others. More specifically, the technology disclosed herein may find applicability in many types of engines and machines having SCR aftertreatment systems. It may also find applicability in other types of exhaust aftertreatment systems in which a reagent is mixed with exhaust gas.

Figure 10:
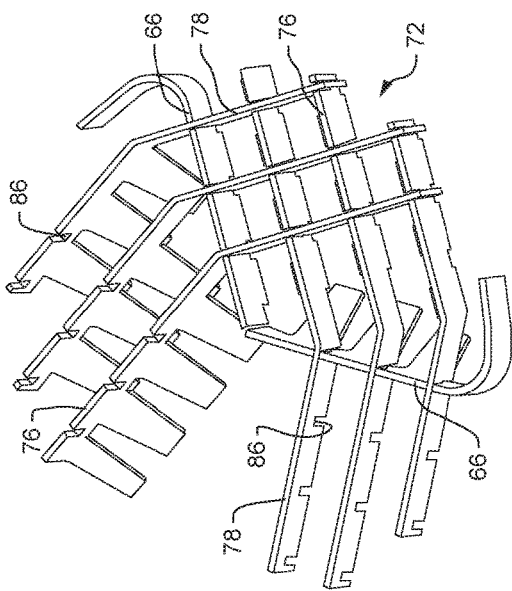
FIG. 10 is a bottom perspective view of two of the units assembled together, in accordance with the method of the present disclosure.
Figure 9:
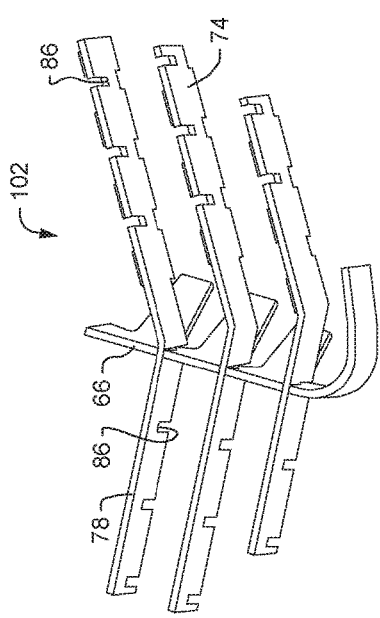
FIG. 9 is a bottom perspective view of one unit of the swirl mixer formed by assembling a radial leg with support elements, in accordance with a method of the present disclosure.
Figure 11:
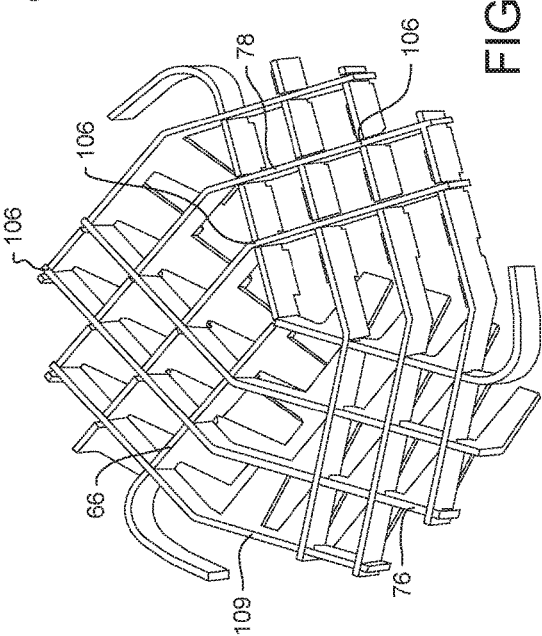
FIG. 11 is a bottom perspective view of three of the units assembled together and welded at nodes to provide the swirl mixer, in accordance with the method of the present disclosure.

Referring now to FIGS. 9-11, steps that may be involved in assembling the swirl mixer 38 are depicted. Namely, FIGS. 9-11 depict steps involved in assembling the swirl mixer 38 with three arrays 56, but it will be understood that the concepts disclosed herein may be similarly applied to swirl mixers having more or less numbers of arrays. Each of the three radial legs 66 may first be separately assembled with a plurality of the support elements 74 to form three units 102. For example, FIG. 9 shows one of the units 102 formed by inserting the slots 86 of the radial leg 66 into slots 86 of three of the second support elements 78. Next, the three units 102 may be assembled together by interconnecting the slots 86 of the support elements 74, as shown in FIGS. 10-11. In particular, this may be carried out by first assembling two of the units 102 together by inserting the slots 86 of the first support elements 76 of one of the units 102 into the slots 86 of the second support elements 78 of another unit 102 to provide one of the grids 72 interconnecting the two radial legs 66 (see FIG. 10). The exposed first and second support elements 76 and 78 of the two assembled units 102 may then be assembled with the third unit 102 by interconnecting the slots 86 of the first support elements 76 and the second support elements 78 (see FIG. 11).

Once assembled, the units 102 may be welded together at nodes 106 (or intersection points between the radial legs 66 and the first support elements 76 with the second support elements 78) to provide the fully assembled swirl mixer 38 (see FIG. 11). As shown in FIG. 11, the units 102 may be welded together on an upstream face 109 of the base 54 (also see FIG. 6). It is noted here that FIGS. 9-11 depict one possible method to assemble the swirl mixer 38, but numerous alternative ways to assemble the mixer 38 exist. For example, the radial legs 66 may first be welded together at the center 64, and the grids 72 may be assembled between the radial legs 66 by interconnecting the support elements 74 and welding the support elements 74 together at the nodes 106. Variations such as these also fall within the scope of the present disclosure.

As disclosed herein, a dual mixer is used to address the problem of balancing the requirements of preventing reducing agent deposit accumulation and increasing the mixing quality of the reducing agent with the exhaust gas in an SCR aftertreatment system. By separating the function of the mixers of the dual mixer disclosed herein, improved performance with respect to both deposit reduction and mixing quality over single mixers of the prior art is realized. The dual mixer of the present disclosure includes a first mixer placed downstream of the reducing agent injector to reduce deposit formation by intercepting the reducing agent liquid from the injector and dispersing the reducing agent liquid into smaller droplets. The first mixer includes a grid structure and a plurality of trapezoidal fins projecting from the grid at a 200 angle to promote evaporation of the reducing agent and reduce deposit formation. The dual mixer further includes a swirl mixer downstream of the first mixer that enhances the evaporation of droplets left behind from the first mixer, and promotes gas phase mixing of the reducing agent with the exhaust gas to improve $NO_x$ conversion efficiencies at the downstream SCR catalyst. Namely, the swirl mixer includes a circling configuration of three arrays of trapezoidal fins that impose a moderate swirl force onto the mixture of the reducing agent and the exhaust gas that is strong enough to provide adequate mixing, but weak enough to avoid undesirable forcing of reducing agent droplets to the walls of the exhaust pipe. Moreover, the swirl mixer exhibits an interconnected framework of grids with threefold rotational symmetry that provides a sturdier and more structurally robust structure than mixers of the prior art that are less interconnected. The technology disclosed herein may find wide industrial applicability in a wide range of areas such as, but not limited to, construction, mining, agriculture, automotive, and rail transport applications.

What is claimed is:

1. A dual mixer for mixing a reducing agent with exhaust gas in a mixing section of a selective catalytic reduction (SCR) aftertreatment system, comprising:
   a first mixer positioned in the mixing section including a grid permitting a flow of the reducing agent and the exhaust gas therethrough, the first mixer further including a plurality of trapezoidal fins projecting from the grid in a direction of flow of the exhaust gas; and
   a swirl mixer positioned downstream from the first mixer in the mixing section and separated from the first mixer by a distance, the swirl mixer including a base permitting the flow of the reducing agent and the exhaust gas therethrough, the swirl mixer further including three radial legs each extending radially from a center of the base, and equally spaced in a circumferential direction, each radial leg having a tab located at a distal end thereof, the tab adapted to allow attachment of the swirl mixer to an exhaust pipe of the aftertreatment system, and three arrays of swirl fins projecting from the base in the direction of flow of the exhaust gas, a last row of fins of each array of fins being supported by one of the three radial legs, and each of the three array of fins arranged in a triangular configuration about a center of the swirl mixer to induce a swirl motion in the reducing agent and the exhaust gas flowing through the swirl mixer, the swirl fins in each of the arrays being oriented in a common direction that is rotated by about 60° from the common direction of the swirl fins in an adjacent array.

2. The dual mixer of claim 1, wherein the first mixer is configured to promote evaporation of the reducing agent flowing therethrough, and wherein the swirl mixer is configured to promote mixing of the reducing agent with the exhaust gas.

3. The dual mixer of claim 2, wherein the grid of the first mixer is planar, and wherein the trapezoidal fins are angled with respect to the grid by about 20°.

4. The dual mixer of claim 3, wherein the grid of the first mixer is formed from a plurality of first support elements arranged perpendicular to and intersecting with a plurality of second support elements, and wherein the trapezoidal fins are formed integrally with and project from the first support elements.

5. The dual mixer of claim 4, wherein the first mixer includes a plurality of parallel rows of the trapezoidal fins, and wherein the trapezoidal fins in each of the parallel rows alternate in orientation direction.

6. The dual mixer of claim 5, wherein the first mixer includes seven parallel rows of the trapezoidal fins, and wherein each of the parallel rows includes three to seven of the trapezoidal fins.

7. The dual mixer of claim 5, wherein each of the trapezoidal fins of the first mixer has a length of about 15 millimeters, and a thickness between 1 millimeter to 2 millimeters.

8. The dual mixer of claim 5, wherein each of the arrays of the swirl mixer includes parallel rows of swirl fins oriented in the common direction.

9. The dual mixer of claim 8, wherein the three radial legs are spaced apart from each other by about 120° in a circumferential direction, wherein the base further includes three grids between the three radial legs, and wherein each of the grids are formed from intersecting support elements.

10. The dual mixer of claim 9, wherein each of the arrays of the swirl mixer consists of swirl fins projecting from the support elements of one of the grids and swirl fins projecting from one of the radial legs.

11. A dual mixer for mixing a reducing agent with exhaust gas in an exhaust pipe upstream of a selective catalytic reduction (SCR) catalyst, comprising:

a first mixer including a planar grid and a plurality of parallel rows of trapezoidal fins projecting from the planar grid in a direction of flow of the exhaust gas, the trapezoidal fins in each of the parallel rows alternating in orientation direction and being angled by about 20° with respect to the planar grid; and a swirl mixer downstream of the first mixer and spaced from the first mixer by a distance, the swirl mixer including a planar base having three of radial legs extending radially from a center of the base and being equally spaced from each other in a circumferential direction, and spaced from each other by about 120° in the circumferential direction, each radial leg having a tab located at a distal end thereof, the tab adapted to allow attachment of the swirl mixer to an exhaust pipe of the aftertreatment system, and the swirl mixer further including a plurality of trapezoidal swirl fins projecting from each of the radial legs in the direction of flow of the exhaust gas, the trapezoidal swirl fins projecting from each of the radial legs being oriented in a common direction that is rotated by an angle with respect to the common direction of the trapezoidal swirl fins projecting from an adjacent radial leg.

12. The dual mixer of claim 11, wherein the common direction of the trapezoidal swirl fins projecting from each of the radial legs of the swirl mixer is rotated by about 60° with respect to the common direction of the trapezoidal swirl projecting from the adjacent radial leg.

13. The dual mixer of claim 12, wherein the base of the swirl mixer further includes three grids between the three radial legs, wherein each of the three grids are formed from a plurality of first support elements oriented perpendicular to and intersecting with a plurality of second support elements, and wherein a plurality of trapezoidal swirl fins project from each of the first support elements in the direction of flow of the exhaust gas.

14. The dual mixer of claim 13, wherein the plurality of first support elements in each of the three grids are parallel to an adjacent radial leg, and wherein the plurality of trapezoidal swirl fins projecting from the first support elements of each grid of the swirl mixer are oriented in the common direction of the trapezoidal fins projecting from the adjacent radial leg.

15. The dual mixer of claim 14, wherein each of the first support elements of the swirl mixer are formed integrally with one of the second support elements in an adjacent grid.

16. The dual mixer of claim 14, wherein the first mixer and the swirl mixer are separated from each other by 2 to 7 inches.

17. The dual mixer of claim 14, wherein each of the trapezoidal fins of the first mixer has a length of about 15 millimeters.

18. The dual mixer of claim 17, wherein each of the trapezoidal fins of the first mixer has a base and a top, the base of each trapezoidal fin having a width of about 10.5 millimeters and the top of each trapezoidal fin having a width of about 6 millimeters.

* * * * *